United States Patent [19]

Bitzer et al.

[11] 4,100,535

[45] Jul. 11, 1978

[54] METHOD AND APPARATUS FOR ADDRESSING AND SUSTAINING GAS DISCHARGE PANELS

[75] Inventors: Donald L. Bitzer; Paul T. Tucker, both of Urbana, Ill.

[73] Assignee: University of Illinois Foundation, Urbana, Ill.

[21] Appl. No.: 738,066

[22] Filed: Nov. 2, 1976

[51] Int. Cl.2 .......................... G06F 3/14; H01J 17/48; H05B 37/00

[52] U.S. Cl. .......................... 340/166 R; 315/169 TV; 340/324 M

[58] Field of Search ...... 340/166 R, 166 EL, 173 PL, 340/324 M

[56] References Cited

U.S. PATENT DOCUMENTS

| | | | |
|---|---|---|---|
| 3,811,124 | 5/1974 | Kleen et al. | 340/324 M |
| 3,906,451 | 9/1975 | Strom | 340/324 M |
| 3,908,151 | 9/1975 | Schermerhorn | 340/324 M |
| 3,919,591 | 11/1975 | Criscimagna | 340/324 M |
| 3,938,107 | 2/1976 | Criscimagna | 340/324 M |
| 3,969,718 | 7/1976 | Strom | 340/324 M |
| 3,973,253 | 8/1976 | Criscimagna et al. | 340/324 M |
| 3,976,993 | 8/1976 | Hirose et al. | 340/324 M |
| 3,979,638 | 9/1976 | Ngo | 340/324 M |

*Primary Examiner*—Donald J. Yusko
*Attorney, Agent, or Firm*—Merriam, Marshall & Bicknell

[57] ABSTRACT

A time-voltage multiplexing system for addressing a particular cell or location on a gas discharge plasma panel in which a group of panel electrodes are charged to the cell voltage firing level but only one electrode of the group is allowed to remain charged for a time duration sufficient for selective discharging of the desired cell. A multiple secondary transformer embodiment incorporating the time-voltage multiplexing addressing system. A method and apparatus for increasing the usable range of sustaining signals for plasma panels by applying a narrow width boost pulse to the panel within a selected time immediately after the initiated sustaining discharge, including means for varying the boost pulse amplitude, width and position with respect to the sustaining discharge so that the usable sustaining signal range can be optimized for a particular plasma panel.

15 Claims, 7 Drawing Figures

METHOD AND APPARATUS FOR ADDRESSING AND SUSTAINING GAS DISCHARGE PANELS

The invention herein described was made in the course of or under a contract with the Department of the Army.

This invention relates to gas discharge devices for display or memory commonly known as plasma panels and in particular to improvements in addressing and operating such plasma panels.

BACKGROUND OF THE INVENTION

Gas discharge panels commonly known as plasma panels have a plurality of gas discharge cells and are constructed of a pair of crossing electrode arrays separated by an insulator from a gaseous medium. Coupling of an appropriate signal to a selected cell or location defined by a respective crossing electrode in each array causes the gas medium therebetween to discharge and to cause the formation of wall charges. The formed wall charges at the cell or location cooperate with alternating sustaining signals to respectively discharge the selected cell for as long as desired. Reference may be made to U.S. Pat. No. 3,559,190 "Gaseous Display and Memory Apparatus", D. L. Bitzer, H. G. Slottow and R. H. Willson, assigned to the University of Illinois Foundation which patent describes such a plasma panel and its operation.

Various techniques have been proposed and several are currently in use in order to uniquely address a particular gas discharge cell defined between a respective electrode in each of the matrix electrode arrays. The basic signal to be applied to a single electrode in each array of the display matrix in order to select one cell or location within that matrix normally is a pulse of approximately 50–150 volts in magnitude and approximately 2–5 microseconds in duration. In general, a positive going pulse is applied to one electrode in the first array and a negative going pulse to the second electrode in the other array associated with the selected cell. Thus, the selected cell discharges since the magnitude of the voltage across the cell is equal to twice the magnitude of the voltage applied to the selected single electrode of each array. However, the remainder of the cells respectively associated with the selected electrode in each array do not discharge since the voltage magnitude applied to the single selected electrode is not sufficient to do so. Therefore only one cell, the one defined at the junction of the addressed or selected electrodes in each array has an adequate signal applied to cause a discharge.

A major item in the total system cost of a plasma display device of this type is the cost of the generation of the addressing signals required. Several viable techniques have been previously demonstrated with the total component per line or electrode density reduced to two diodes and a single resistor for a total of three. Thus, a normal plasma display panel containing a 512 × 512 matrix array, requires a total of 3072 addressing components per panel. A normal communications system may contain anywhere from 10 to 1000 of such panels so that the number of components per system rapidly becomes significant. It therefore becomes extremely desirable to reduce the overall cost of a system incorporating plasma panels by reducing the number of components required per panel electrode to address a desired cell or location on the anel.

In the operation of plasma panels, it is desirable to provide a sustaining signal which can reliably repetitively discharge cells in the on state and yet which will not discharge cells which are in the off state. The range over which the sustaining signal amplitude can vary is bounded on the lower limit by the voltage which causes a cell in the on state to go into the off state, and on the upper limit by the voltage which causes a cell in the off state to go into the on state. The usable voltage range over which an applied sustaining signal can vary and satisfactory plasma panel operation obtained is defined as that range between the voltage at which the first on cell is caused to go off (i.e. first on-to-off cell) on the lower limit and the first off cell to go on (i.e. first off-to-on cell) at the upper limit.

Due to the fact that plasma panels provide an enormous number of cells (normally 512 × 512 cells) and the difficulty in manufacturing uniform plasma panels, measurements made on existing production plasma panels indicate that this usable voltage range with present sustaining signals can vary from 10–15% of the normal sustaining signal potential level of 120 volts. In other words, depending primarily on the characteristics of a particular plasma panel, the usable range of presently utilized sustaining signals can range from 12 volts for one panel to possibly 18 volts or more for another panel.

Suggestions or attempts have been made by others to increase the reliability of discharging an off cell to place it in the on state during addressing by inducing an overshoot in the leading edge of the addressing signal waveform which provides overcharging immediately before the actual cell discharge. However, attempts to apply an overshoot onto the leading edge of a sustaining signal waveform immediately before a sustaining discharge to improve the usable range have achieved only a very slight usable range increase. It becomes therefore extremely desirable to increase the usable range of sustaining signals so as to increase the reliability of the sustaining operation with any particular plasma panel and in order to provide an increased margin of acceptable panels for the plasma panel manufacturer.

SUMMARY OF THE INVENTION

According to one aspect of the invention, there is provided an improved system for addressing a selected cell or location defined by the crossing electrodes in a plasma panel array. In particular, there is provided a time-voltage multiplexing addressing system wherein several electrodes have applied to them a sufficient voltage, but only one electrode has a sufficient voltage and a sufficient time duration to initiate a discharge of the gaseous medium in the selected cell. One technique of implementing this time dependent addressing system is to take advantage of the intrinsic capacity between plasma panel electrodes and the surrounding panel areas and to utilize this capacity as a time storage means. In particular a partially selected group of plasma panel electrodes are pulsed to charge the electrodes with an appropriate addressing voltage magnitude. Clamp switches coupled to the partially selected group of electrodes then are selectively operated so as to discharge the addressing voltage 300–400 nanoseconds after initiation on all but the selected electrode. The selected electrode, however, is allowed to remain charged to the appropriate addressing voltage magnitude for a pulse width of 4–5 microseconds. Therefore, only the selected electrode will have a signal applied of sufficient voltage and of sufficient time duration to cause the selected cell to discharge.

Utilizing this newly improved addressing technique, the total component per line density can be reduced to just two diodes compared to three components per line in the prior art. In the case of a 512 × 512 plasma panel, this means the elimination of the formerly required power consuming resistor per electrode reduces the power consumption as compared to prior art addressing systems by about 25%.

Furthermore, a reduction in the total system components required for addressing can be achieved by utilizing this new technique with multiple secondary transformers. For instance, for 256 plasma panel lines, using standard pulse transformers and drivers would require 16 transformers and 16 drivers — whereas only 4 multiple secondary transformers, 4 drivers and 4 clamp switches would be required for the 256 lines.

In accordance with another aspect of the present invention, it has been found that by applying a discharge boost pulse to the plasma panel within a selected time immediately following an initiated sustaining discharge, a significant improvement can be obtained in the range over which the applied sustaining signal voltage can vary and still provide normal sustaining operation in the plasma panel. In particular, means are provided for generating a boost pulse aving an amplitude of about 40 volts, a pulse width of about 300 nanoseconds, and for adding such a pulse to a normally utilized 120 volts sustaining signal at about 750 nanoseconds after the rise or leading edge of the sustaining signal waveform associated with the occurrence of the cell sustaining discharge. Furthermore, means are provided for varying the amplitude between about 20–45 volts, the width between about 200–300 nanoseconds and the position of the boost pulse between about 600–950 nanoseconds after the leading edge of the sustaining signal waveform so that the usable sustaining signal range with any particular plasma panel can be optimized as desired.

Using this aspect of the invention, the usable range over which the applied sustaining signal may vary and satisfactory operation obtained can be doubled to more than 30 volts or more than 25% of the sustaining signal voltage level as compared to the prior art usable range of approximately 12–18 volts or 10–15% of the sustaining signal voltage level. Studies indicate that the separately applied boost pulse stimulates the already initiated sustaining discharge to become more intense and thereby causes adequate wall charges to be deposited. Those cells which are in the off state will not be affected by the boost pulse because it is too small to initiate a discharge alone.

DETAILED DESCRIPTION

Figure 1:
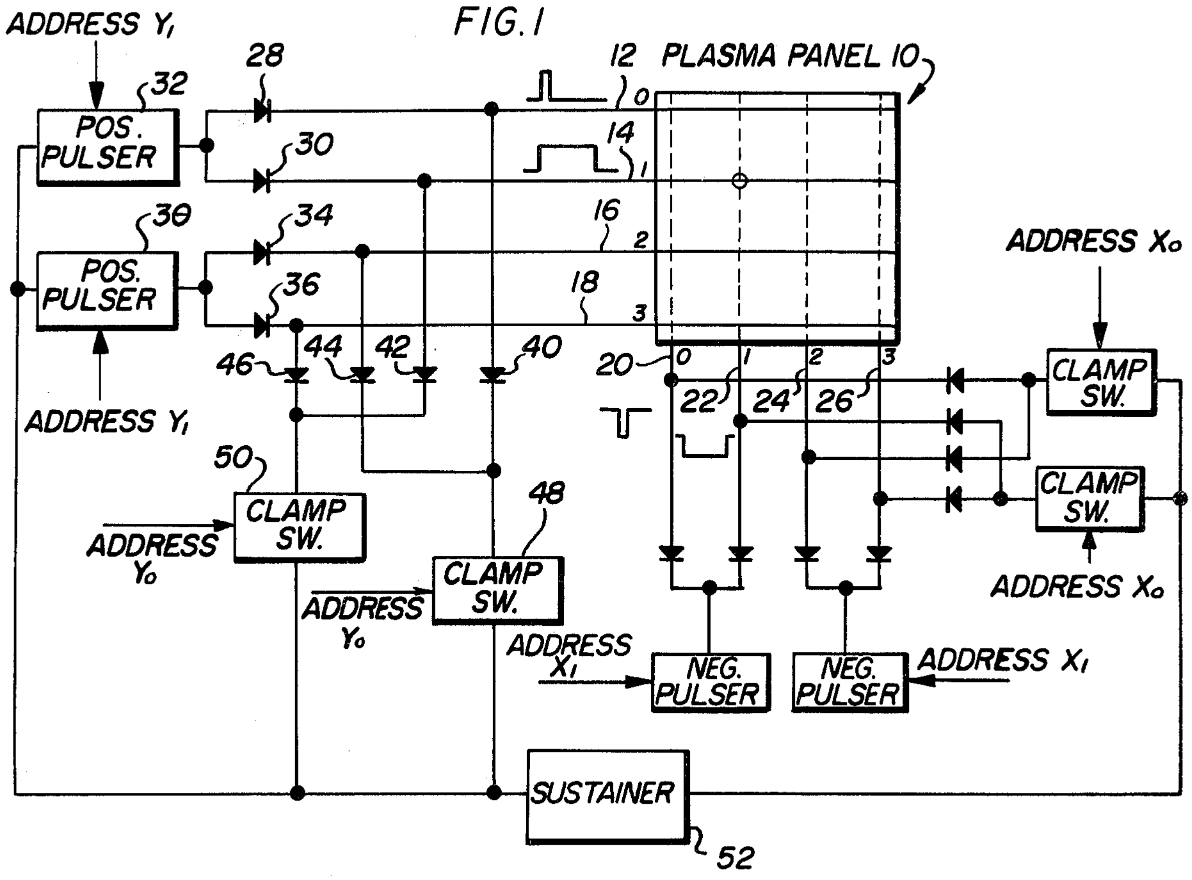
FIG. 1 is a schematic diagram illustrating a new time multiplexing addressing technique wherein a number of plasma panel lines are addressed but only one line is selected and wherein the panel capacitance is utilized for time storage.
Figure 2:
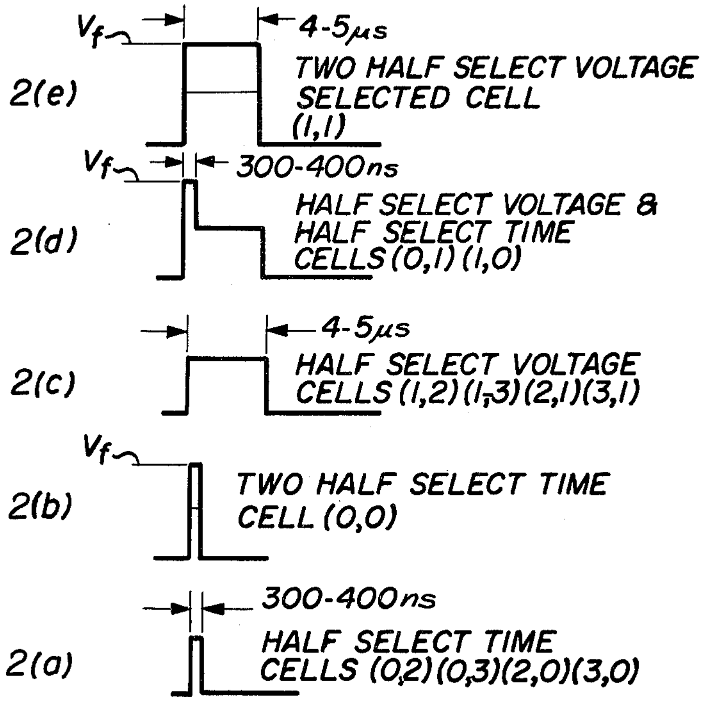
FIG. 2 illustrates a series of waveforms provided by the apparatus of FIG. 1.

Referring now to FIG. 1, there is schematically illustrated a gas discharge panel or plasma panel 10 of the type described in the aforementioned U.S. Pat. No. 3,559,190, having a plurality of crossing electrodes in respective arrays on each side of the panel separated by insulating material containing a gaseous medium. For purposes of describing the present invention, the plasma panel 10 shown in FIG. 1 is illustrated as including four electrodes in each array, and it is to be understood that the normal plasma panel may contain, for instance, 512 electrodes in each array — although panels with as many as 1024 electrodes in each array have been constructed. The electrodes in the Y matrix array are each connected to respective conductive lines 12, 14, 16 and 18; and the electrodes in the X matrix array are respectively connected to lines 20, 22, 24 and 26. In the illustrated plasma panel, there are therefore 16 gas cells or locations defined on the panel by an intersection of respective electrodes in the X and Y matrix array. For instance, gas cell or location 0, 0 on the panel is defined between lines 12 and 20; and gas cell 1, 1 is defined between lines 22 and 14.

With respect to the Y matrix array, the lines 12 and 14 are connected through respective diodes 28, 30 to a positive pulsing unit 32. Lines 16 and 18 are connected through respective diodes 34, 36 to another pulsing unit 38. Each of the positive pulsing units 32 and 38 is respectively addressed by a central processor such as a computer to supply the respective address $Y_1$.

Another plurality of diodes, 40, 42, 44, 46 are each connected at one diode end to a respective panel line 12, 14, 16 and 18. The other end of diodes 40, 44 are connected together and to the switch 48. Similarly, the other end of diodes 42, 46 are connected together and to switch 50. The switches 48 and 50 can be formed of clamping transistors driven by respective address signal $Y_0$ supplied from a central processor to drive the respective switches selectively between their high conductive and low conductive states in a manner well known in the art. As can be seen from FIG. 1, if for instance clamp switch 48 is driven on, i.e. into the low conductive state, diodes 40 and 44 will conduct to place a low impedance, effectively a short on lines 12 and 16. A similar set of apparatus are connected to the X lines 20, 22, 24 and 26 connected to the panel electrodes in the X array.

Therefore, as can be seen from FIG. 1, the addressing of positive pulsers 32 and 38 can select either the first group of lines 12 and 14 or the second group of lines 16 and 18. Furthermore, selective addressing of the clamp switches 48 and 50 can further select one line in each of the groups so that a particular line in the Y array can be selected. A line in the X array 20, 22, 24 or 26 can similarly be selected so that the corresponding plasma panel position or cell associated with the two selected intersecting lines or electrodes can be selected.

Thus, in accordance with the principles of the present invention, either positive pulser 32 or 38 is addressed to selectively provide a short pulse width signal to be applied to lines 12, 14 or lines 16, 18. The present invention utilizes the normally large intrinsic capacity between panel electrodes and between the electrodes and the panel material. As shown in FIG. 1, positive pulser 32 is addressed so that lines 12 and 14 are driven with a narrow pulse of 300–400 nanoseconds. These lines charge up to a voltage level due to the panel capacitance. Immediately after the charging is initiated, switch 48 is addressed to forward bias diode 40 and thereby discharge the voltage on line 12. The voltage on line 14 on the other hand is allowed to remain charged to a pulse width of about 4–5 microseconds and to a voltage magnitude sufficient, when combined with a similar signal on one of the lines in the X array, to discharge the corresponding cell and thereby provide the desired addressing and selection of a particular location on the plasma panel. For instance, as shown in FIG. 1, lines 20 and 22 have been addressed, but line 20 has been discharged after about 300–400 nanoseconds so that only line 22 has a voltage magnitude and a time duration sufficient when combined with the signal on line 14 to discharge the corresponding cell 1, 1.

With reference to FIGS. 2(a)–2(e), there is illustrated a series of signal waveforms which are present at the indicated cells in the illustrated selection of cell 1, 1 corresponding to a location on the plasma panel defined by the intersection of line 14 of the Y electrode array and line 22 of the X electrode array. The signal waveforms shown in FIG. 2 correspond to the normal selection technique termed "half select", wherein half of the required voltage magnitude is applied to one of the lines in one array and the other half of the required voltage magnitude is applied to another line in the other line array. Thus, FIG. 2 illustrates the signal waveforms representing the voltage waveforms across a cell, i.e. between two crossing electrodes on the panel.

As shown by the waveform in FIG. 2(a), there are four distinct cells on the plasma panel which have across their respective electrodes a signal which may be termed "half select time" by virtue of the discharged voltage present on lines 12 and 20. FIG. 2(b) illustrates the combination of the two half select time signals present at cell 0, 0. While the voltage magnitude, $V_f$, on cell 0, 0 is of a sufficient cell firing magnitude, the cell does not discharge since the signal time duration of approximately 300–400 nanoseconds is insufficient to cause a gas discharge. FIG. 2(c) illustrates the half select voltage signal present on lines 14 and 22. While this combined voltage is of a sufficient time duration, i.e. 4–5 microseconds, the voltage magnitude is only half that required for a gas discharge and therefore no selection takes place at the denoted four cells. FIG. 2(d) illustrates the signal waveform present at the noted two cells at the intersection of lines 14 and 20 and between lines 12 and 22, respectively. In this instance, the combination of a half select voltage on one line combines with a half select time signal on the other line to produce the required selection voltage only over a narrow 300–400 nanoseconds pulse width which again is insufficient to discharge the cells. FIG. 2(e) illustrates the only cell in the array in which due to the half select voltage present on both lines 14 and 22, the combination of two half select voltage signals is of a sufficient full select, $V_f$, magnitude over a sufficient time duration of 4–5 microseconds in order to discharge the corresponding gas cell and thereby select cell 1, 1 on the plasma panel.

It is to be understood of course that since there are no signals present on lines 16, 18 and 24, 26, there are no signals present on the corresponding cells defined by these intersecting lines or electrodes. It is also to be understood that this time-voltage multiplexing addressing technique can be extended to the more general case where more than one level of either time or voltage is used. For purpose of illustrating the complete plasma panel environment, a sustainer signal generator 52 is indicated as coupled between the two panel electrode arrays to provide the alternating sustaining signals in a manner well known in the art.

Figure 3:
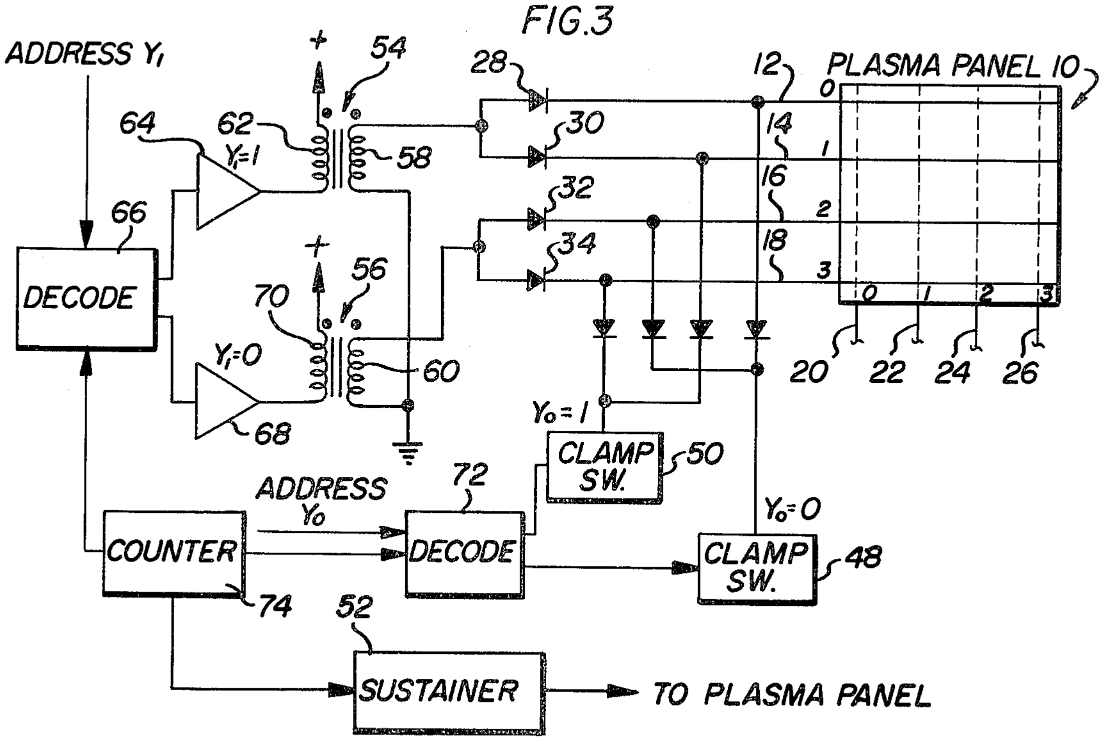
FIG. 3 is a schematic diagram illustrating a specific embodiment of the invention incorporating pulse transformers.

Referring now to FIG. 3, there is illustrated one apparatus embodiment of the invention shown in FIG. 1, wherein the Y array lines 12, 14, 16 and 18 are connected through respective diodes 28, 30, 32 and 34 in a paired manner, respectively to a transformer 54 or transformer 56. The secondary 58 of transformer 54 is connected to one end of the diodes 28 and 30 for addressing lines 12 and 14. The secondary 60 of transformer 56 is similarly connected to address the lines 16 and 18. The primary 62 of transformer 54 is connected between a power supply and a driver 64, which driver is operated from one output of a decoder 66. The other output of the decoder 66 operates a similar driver 68 connected to the primary 70 of transformer 56.

Addressing signal $Y_1$ from a central processor or computer provides a drive signal into either driver 64 or 68 so as to select lines 12 and 14 or lines 16 and 18. As noted in FIG. 3, the drive signal at the input of driver 64 produces a positive pulse at the secondary 58 of transformer 54 so as to initiate charging on lines 12 and 14. Addressing signal $Y_0$ from the central processor or computer is processed by decoder 72 to selectively provide a selection signal into either clamp switch 48 or 50. As shown in FIG. 3, switch 50 has been selected so that all of the other lines in the first group of electrodes will be discharged except for line 14 associated with switch 50. Thus, switch 48 operates to place a low impedance short on line 12 to immediately discharge this unselected charged line after about 300–400 nanoseconds, whereas the selected line 14 is allowed to remain at a charged voltage for 4–5 microseconds as previously described. A counter 74 of a type well known in the art times the addressing and the sustaining panel operations. It is to be understood that the apparatus of the type shown in connection with the Y electrode array is also coupled to the X electrode array, except of course for the connection of each secondary of the pulse transformers being reversed phased to provide a negative output pulse. Because of the interelectrode capacitance between adjacent plasma panel electrodes, the discharge panel lines may tend to lower the voltage on the selected line. This can readily be remedied by increasing the spacing between the panel electrodes in the same group.

Figure 4:
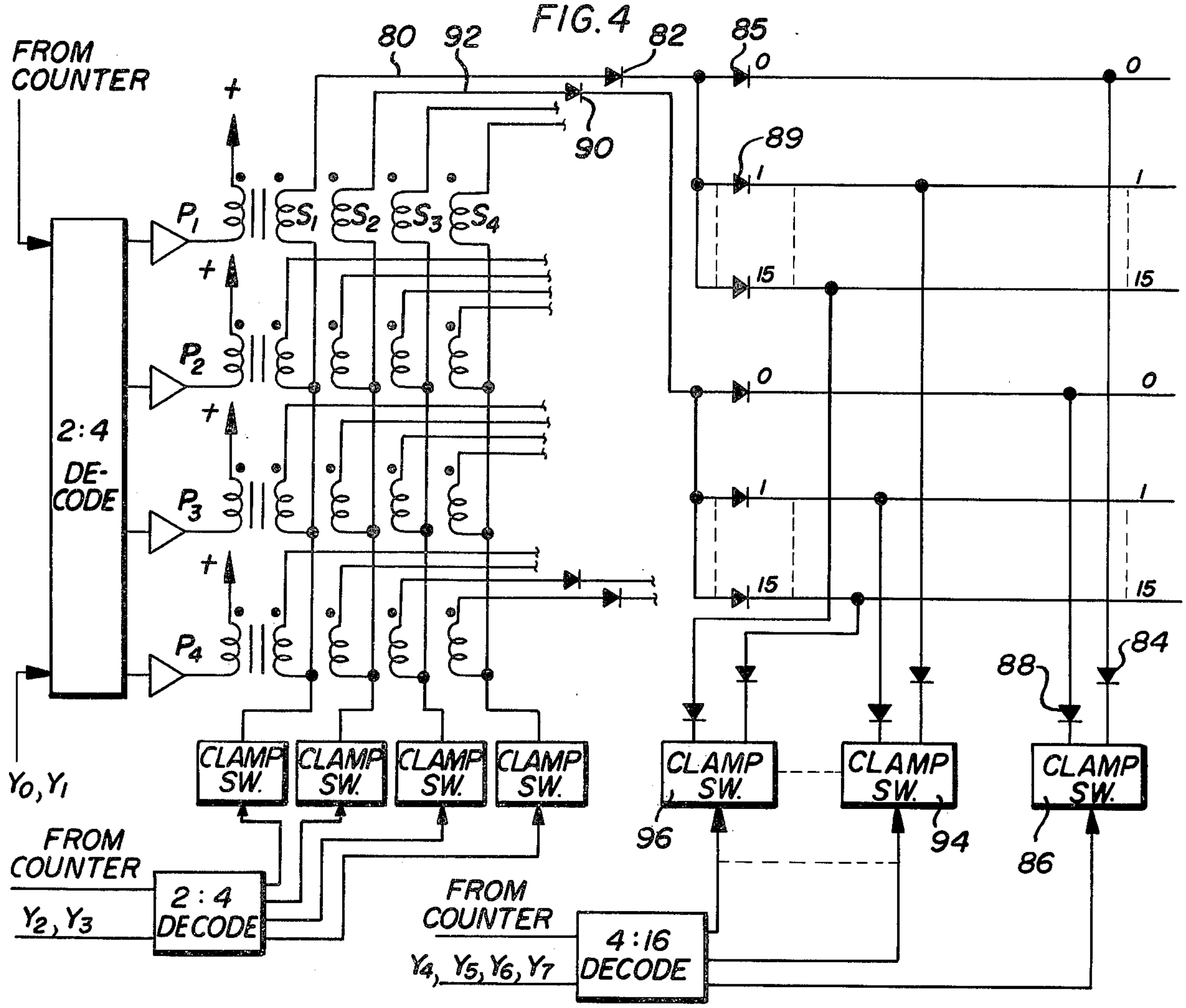
FIG. 4 is a schematic diagram illustrating another embodiment of the invention incorporating a plurality of multiple secondary transformers.

Referring now to FIG. 4, there is illustrated another embodiment of the invention which utilizes a plurality of multiple secondary transformers for further reducing the number of components required in a complete panel system. Each of the multiple secondary transformers comprises a primary such as primary $P_1$ and a plurality of secondary windings such as secondaries $S_1$, $S_2$, $S_3$ and $S_4$. Each primary and its associated four secondaries may all be wound on a single toroidal core in a manner well known in the art. One end of each primary winding is connected to a positive power supply and the other end of the primary winding is connected to a pulse driver. As shown in FIG. 4, each of the pulse drivers is in turn connected at its input side to a two bit four line decoder for selection of one of the primaries $P_1$, $P_2$, $P_3$ or $P_4$. One end of the secondary winding $S_1$ of primary $P_1$ is connected to the same respective end of each of the secondaries $S_1$ associated with the respective primaries $P_2$, $P_3$, and $P_4$, and this same end is in turn connected to a clamp switch. The same connections are provided for each of the secondary windings $S_2$ of each of the multiple transformers, with the same ends being in turn connected to a respective clamp switch. One out of the four clamp switches can be selected by a two bit four line decoder coupled between a central processor supplying the addressing information and the respective clamp switches. Thus, one of the primaries $P_1$ through $P_4$ may be selected and one of the four groups of secondary windings $S_1$ through $S_4$ may be selected.

The other end of each respective secondary winding is coupled through a diode to 16 lines on the plasma panel. Thus, for instance, the line 80 is connected to one end of secondary winding $S_1$ associated with primary $P_1$ and at the other end is connected through diode 82 to 16 lines on the plasma panel. Each of the panel lines is coupled to a pair of diodes and clamp switch in the same manner as shown in FIG. 3. For instance, the first line of a first group of 16 panel lines is connected through diode 84 to clamp switch 86 and through diode 85 to diode 82 and eventually to secondary $S_1$. The first line in the second group of 16 panel lines is connected through diode 88 to the same clamp switch 86, and through diode 89 to diode 90 and eventually to the secondary winding $S_2$ associated with the same primary $P_1$.

Thus, clamp switch 86 is coupled to the first line of each group of 16 panel lines associated with the respective secondary windings $S_1$, $S_2$, $S_3$ and $S_4$ of each of the associated primaries $P_1$, $P_2$, $P_3$ and $P_4$. Clamp switch 94 is connected to the second line of each group of 16 panel lines in the same manner, and the connections continue with the 16th clamp switch 96 in the group being connected to each of the last lines in each of the 16 lines per group associated with each of the secondaries.

A four bit 16 line decoder responding to timing signals from the counter and to four bits supplied from the central processor selects one of the 16 clamp switches and therefore selects one line in each of the groups of 16 lines associated with each of the secondaries. Therefore, in operation, one of the four primaries is selected and one of the four secondaries associated with that primary is selected so as to select for instance line 80 which is coupled to a group of 16 lines on the panel in the same manner as the secondary winding 58 shown in FIG. 3 is connected to a group of two lines on the panel shown in FIG. 3. Assuming that the first plasma panel line of the group connected to line 80 is to be selected, the four bit 16 line decoder is operated to selectively address the 16 clamp switches so as to allow only the first plasma line connected to diode 84 and clamp switch 86 to remain charged to a pulse width of about 4–5 microseconds. On the other hand, the second and all of the 15 other lines in the first plasma line group are discharged after about 300–400 nanoseconds in the manner previously described in connection with FIGS. 1–3. Thus, only the first plasma panel line will have a voltage magnitude of sufficient time duration when combined with a crossing electrode in the X array to discharge a selected cell.

The multiple secondary embodiment of FIG. 4 further reduces the number of components required in an addressing system utilizing the present invention. For instance, for the 256 lines of FIG. 4, four multiple secondary transformers, four drivers and four clamp switches are required whereas for the single secondary configuration of FIG. 3. 16 transformers and 16 drivers would be required for the same 256 lines.

Figure 5:
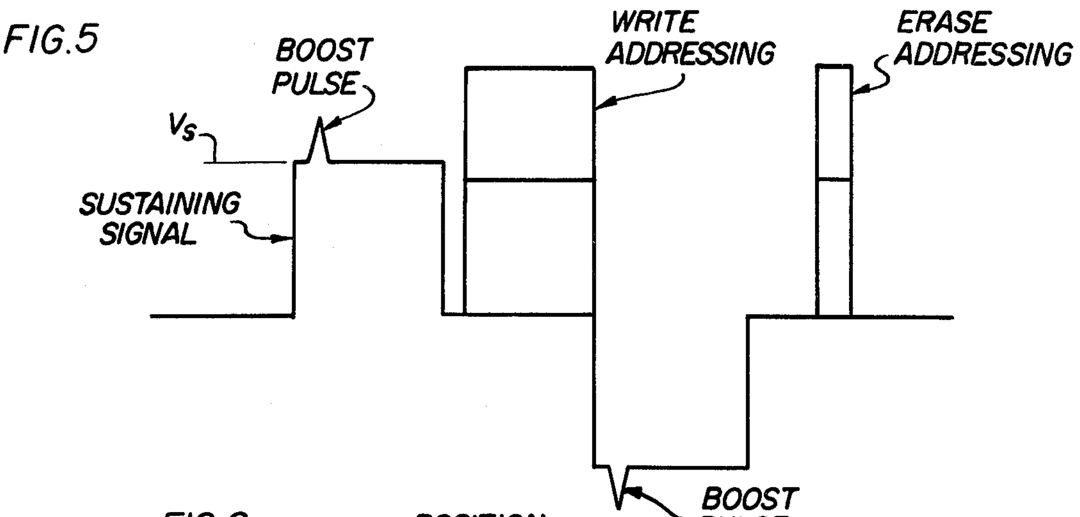
FIG. 5 illustrates an ideal sustaining signal waveform incorporating a boost pulse for increasing the usable range of a sustaining signal, thereby improving the sustaining operation reliability.
Figure 6:
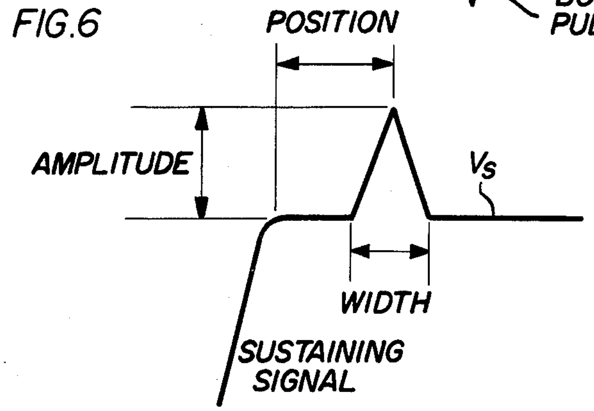
FIG. 6 illustrates the boost pulse parameters — pulse amplitude, width and position with respect to the leading edge of the sustaining signal associated with the occurrence of the sustaining discharge for optimizing the usable sustaining signal range.
Figure 7:
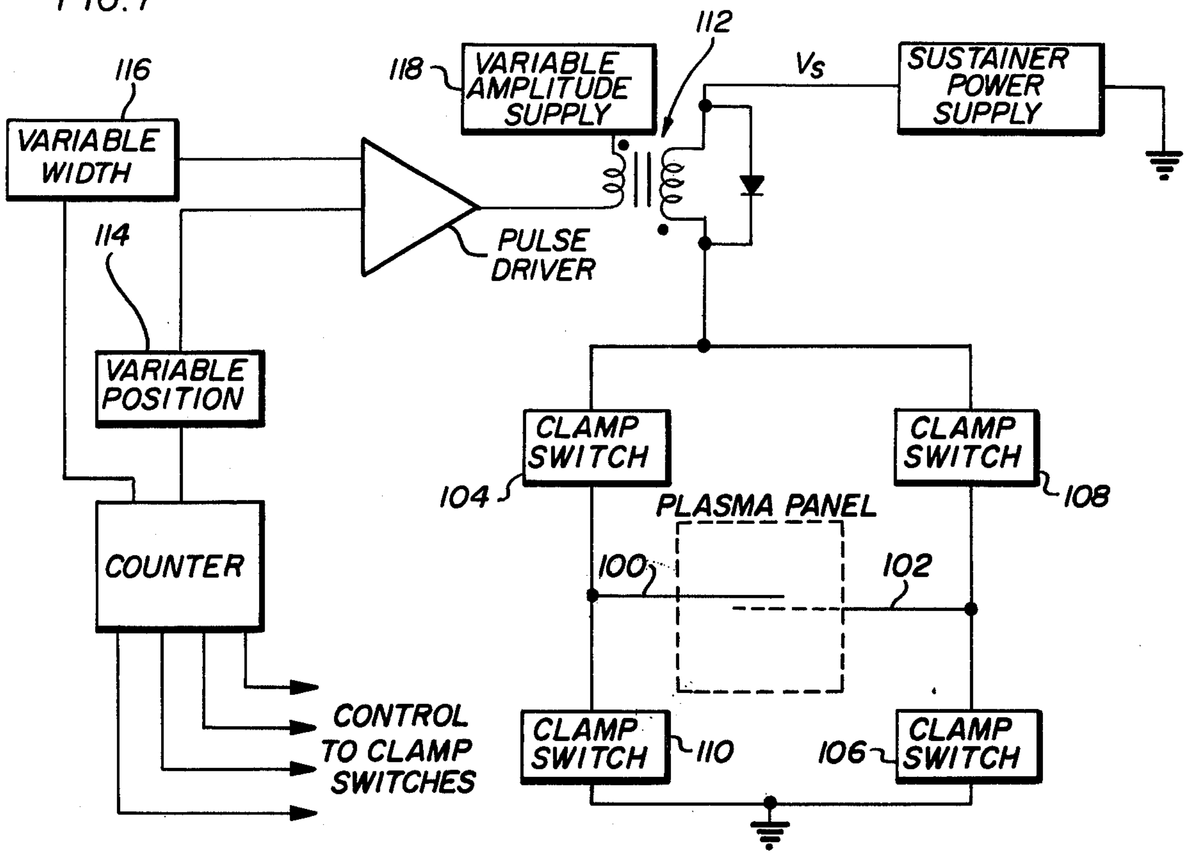
FIG. 7 is a schematic diagram illustrating an improvement of the invention wherein the boost pulse as shown in FIG. 5 is supplied to a plasma panel and may be varied in amplitude, width and position to optimize the usable range of sustaining signals for a particular plasma panel.

Referring now to FIGS. 5 through 7, there is illustrated a technique for increasing the usable range of sustaining signals with plasma panels and for optimizing the sustaining signal usable range in connection with a particular plasma panel. FIG. 5 illustrates a standard sustaining signal of amplitude $V_s$ which is normally able to turn on cells which have been previously placed into the on state but which will not affect cells which are in the off state. FIG. 5 also contains for purposes of illustration a write or addressing waveform composed for instance of two half select voltage signals sufficient to turn on a cell; and an erase addressing signal sufficient to turn off a cell which has previously been placed in the on state.

According to one aspect of the present invention, a boost pulse shown in FIG. 5 has been added to the sustaining signal waveform at a selected time or position immediately following the leading edge of the sustaining signal associated with the cell sustaining discharge. It has been found that by applying this short discharge boost pulse to the plasma panel within a selected time immediately following the actual sustaining discharges, those initiated sustaining discharges which were previously insufficient to sustain can be stimulated to become more intense, while on the other hand those cells which did not have discharges at all, i.e., those which were in the off state, will not be affected by the boost pulse because it is too small to initiate a discharge alone. This lowers the range of the first on-to-off voltage thereby extending the usable range over which the applied sustaining signal can be varied and satisfactory operation still be obtained.

In connection with the present invention, we have found that applying a short discharge boost pulse about 100–200 nanoseconds after the initiated sustaining discharge results in a decrease in the usable range of sustaining signals. However, applying the boost pulse about 600–950 nanoseconds after the initiated sustaining discharge results in an increase in the usable range. These figures vary somewhat depending upon the particular plasma panel used in the investigation.

FIG. 6 illustrates the several parameters of the boost pulse which have been found to affect its operation. In particular, the pulse amplitude, the pulse position or time with respect to the top of the leading edge of the sustaining signal associated with the occurrence of a sustaining discharge, and the pulse width may all be varied so as to provide a variation in the first off to on cell at the top of the range and the first on to off cell at the bottom of the range. Table I below contains data showing the values of the top and bottom range ends and of the range values with respect to variations in the boost pulse width, amplitude and position correlating to the parameters as shown in FIG. 6.

TABLE I

Boost Pulse Width, Amplitude, Position vs. Sustaining Signal Usable Range

| Width (Nsec) | Amplitude (Volts) | Position (Nsec) | First Off To On Volts) | First On To Off (Volts) | Usable Range (Volts) |
|---|---|---|---|---|---|
| 0 | 0 | 0 | 136.7 | 116.8 | 19.9 |
| 300 | 20 | 750 | 134.8 | 111.6 | 23.2 |
| 300 | 20 | 650 | 133.2 | 110.0 | 23.2 |
| 300 | 20 | 550 | 130.9 | 109.3 | 21.6 |
| 300 | 20 | 950 | 135.9 | 115.8 | 20.1 |
| 300 | 20 | 850 | 134.9 | 115.9 | 19.0 |
| 300 | 40 | 850 | 132.3 | 101.5 | 30.8 |
| 300 | 40 | 700 | 130.8 | 99.6 | 31.2 |
| 300 | 40 | 650 | 116.4 | 101.5 | 14.9 |
| 300 | 40 | 725 | 131.0 | 99.0 | 32.0 |
| 300 | 40 | 600 | 116.0 | 101.7 | 14.3 |
| 300 | 40 | 640 | 115.0 | 102.0 | 13.0 |
| 200 | 40 | 800 | 134.0 | 101.0 | 33.0 |
| 200 | 40 | 950 | Double Firing | | |
| 200 | 50 | 825 | 134.2 | 100 | 34.2 |
| 200 | 50 | 750 | 133.2 | 109.0 | 24.2 |

Thus, depending on the plasma panel, a boost pulse amplitude of about 20–45 volts, with a pulse width of about 200–300 nanoseconds applied about 600–950 nanoseconds after the already initiated sustaining discharge has been found to provide the desired significant increase in the usable range of the sustaining signal.

FIG. 7 illustrates the apparatus for obtaining a variation in the boost pulse parameters so as to optimize the sustaining signal usable range in connection with any particular plasma panel. For purposes of illustration, the two intersecting panel lines 100, 102 in respective opposing arrays of the panel are connected to the usual clamp switches 104, 106 and 108, 110. A common sustainer power supply is coupled between the clamp switches and ground as illustrated. In addition, the normally supplied counter having interconnections to the respective clamp switches is utilized to time the operation of the clamp switches 104 and 106 to place the leading edge of the sustaining signal on the cell associated with the lines 100, 102 and to time the operation of clamp switches 108 and 110 to provide the leading edge of the alternating next cycle of the sustaining signal to the cell associated with lines 100, 102.

As shown in FIG. 7, the boost pulse is provided on top of the sustaining signal by coupling the output of the counter to a pulse driver with the output of the pulse driver operating into the transformer 112. Thus, the pulse driver is triggered immediately after the counter operates the clamp switches 104 and 106 to produce the first positive leading edge of the sustaining signal resulting in a sustaining discharge, and the pulse driver is again triggered immediately after the clamp switches 108 and 110 are operated by the counter providing the negative leading edge in the next half cycle of the sustaining signal as shown in FIG. 5 for the next succeeding sustaining signal discharges.

The counter operates into a variable position trigger circuit 114 interposed between the counter and the pulse driver so that delaying the trigger pulse into the pulse driver will vary the position of the boost pulse with respect to the leading edge of the sustaining signal waveform. A variable width trigger circuit 116 reacts in response to an output from the counter to vary the boost pulse width. The pulse driver may for instance comprise a transistor circuit whose turn on time is varied to obtain a variable boost pulse position and whose turn off time is varied to obtain a variable boost pulse width. The boost pulse amplitude may be adjusted by varying the supply 118 connected to the primary of transformer 112. Other well known components can be readily provided. In any event, the variation in amplitude, position and width of the boost pulse can be accomplished for a particular plasma panel and these variations may be locked in position so as to obtain the optimized sustaining signal usable range under such conditions.

The foregoing detailed description has been given for clearness of understanding only, and no unnecessary limitations should be understood therefrom as modifications will be obvious to those skilled in the art.

What is claimed is:

1. Apparatus for addressing selected electrodes in an array of electrodes respectively associated with a particular location on a gas discharge panel, said apparatus comprising:
   - pulse means coupled to a group of said electrodes to charge said group of electrodes to a voltage magnitude sufficient to select a location on said panel;
   - said pulse means providing a pulse signal having an amplitude substantially equal to said voltage magnitude and a time duration insufficient to select a location on said panel; and
   - time selection means coupled to said group of electrodes for subsequently timely discharging said voltage magnitude on all except one electrode in said group of electrodes so that only said one electrode has an applied pulse signal amplitude and time duration sufficient to enable selection of a location associated with said one electrode.

2. Apparatus as claimed in claim 1, including a plurality of said pulse means, each coupled to a respective group of said electrodes,
   - decoder means for addressing one of said pulse means and the associated addressed group of electrodes;
   - and wherein said timed selection means includes a plurality of switch means, each coupled to one electrode in each group operable for subsequently timely discharging said voltage magnitude on all except one electrode in said addressed group.

3. Apparatus as claimed in claim 2, wherein each of said pulse means includes a pulse transformer having a secondary coupled to a respective group of electrodes and a primary coupled to said decoder means.

4. Apparatus as claimed in claim 1, wherein said timed selection means comprises means for discharging said voltage magnitude on all except one electrode in less than one microsecond after said group of electrodes are charged to said voltage magnitude.

5. Apparatus as claimed in claim 1, including a first plurality of diodes, each connected between a respective electrode and said pulse means, and a second plurality of diodes, each connected between a respective electrode and said timed selection means.

6. Apparatus for addressing selected electrodes in an array of electrodes respectively associated with a particular location on a gas discharge panel, said apparatus comprising:
   - a plurality of pulse drivers, each coupled to a respective group of said electrodes;
   - a plurality of clamp switches, each coupled to one of said electrodes in each group of electrodes; and
   - time control means coupled to said pulse drivers and to said clamp switches for selecting one of said pulse drivers utilizing the intrinsic panel capacitance to charge the associated selected group of electrodes to a voltage magnitude sufficient to select a location on said panel and for operating said clamp switches to discharge said voltage magnitude immediately after formation thereof on all except one electrode in said selected group of electrodes, whereby a location associated with said one electrode is selected.

7. A method for addressing selected electrodes in an array of electrodes respectively associated with a particular location on a gas discharge panel, said method comprising:

utilizing the intrinsic panel capacitance to charge a group of said electrodes to a voltage magnitude sufficient to select a location on said panel; and discharging said voltage magnitude immediately after formation on all except one of said electrodes to enable selection of a location associated with said one electrode.

8. The method of claim 7, including the steps of selecting one of a plurality of groups of electrodes for charging said selected group of electrodes to said voltage magnitude.

9. An addressing system for plasma panels having an array of electrodes, said apparatus comprising:

a plurality of multiple secondary transformers each having a primary and a plurality of secondaries;

means for connecting one end of each secondary to a respective group of a plurality of groups of plasma panel electrodes;

means for selecting at least one of said secondaries;

means for selecting one of said primaries utilizing the intrinsic panel capacitance to charge all of the plasma electrodes in the selected group coupled to the selected secondary to a voltage magnitude sufficient to select a location on said panel; and timed electrode selection means coupled to said electrodes for discharging all of said plasma panel electrodes in said selected group except one to enable selection of a location associated with said one electrode.

10. An addressing system as claimed in claim 9, wherein said timed electrode selection means comprises a plurality of switch means each coupled to a respective electrode in each of said group of plasma panel electrodes operable for subsequently timely discharging said voltage magnitude on all of said electrodes in said selected group except one to enable said selection of a location associated with said one electrode.

11. A method of increasing the usable range of sustaining signals initiating sustaining discharges in a plasma panel system comprising:

providing a low amplitude, narrow width pulse; and applying said pulse to said plasma panel between about 600–950 nanoseconds after the sustaining discharges initiated by said sustaining signals.

12. A method of optimizing the usable range of sustaining signals initiating sustaining discharges in a plasma panel system comprising the method of claim 11, and including the steps of varying the amplitude, width and position of said pulse with respect to the occurrence of said sustaining discharge.

13. A method of increasing the usable range of sustaining signals initiating sustaining discharges in a plasma panel system comprising:

providing a pulse having an amplitude of about 40 volts and a width of about 300 nanoseconds; and applying said pulse to said plasma panel about 750 nanoseconds after the sustaining discharges initiated by said sustaining signals.

14. The method of claim 13 including the steps of selectively varying said pulse amplitude, width and position.

15. In a plasma panel system wherein sustaining signals applied to the plasma panel electrodes initiate sustaining discharges, the improvement of means for increasing the usable range of said sustaining signals, said improvement comprising:

means generating a low amplitude, narrow width pulse; and means for applying said pulse to said plasma panel electrodes between about 600–950 nanoseconds after the sustaining discharge initiated by said sustaining signals.

* * * * *